United States Patent [19]

Lipman

[11] Patent Number: 4,951,699
[45] Date of Patent: Aug. 28, 1990

[54] FUEL TRANSFER SYSTEM WITH ASPIRATOR

[75] Inventor: John M. Lipman, Norwich, England
[73] Assignee: Chrysler Corporation, Highland Park, Mich.
[21] Appl. No.: 431,814
[22] Filed: Nov. 6, 1989
[51] Int. Cl.⁵ ............................................. F04F 10/00
[52] U.S. Cl. .................................. 137/142; 137/147; 137/571; 137/590; 280/833
[58] Field of Search ............... 137/142, 147, 571, 590; 280/833

[56] References Cited

U.S. PATENT DOCUMENTS

| | | |
|---|---|---|
| 431,542 | 7/1890 | Bailey . |
| 1,472,428 | 10/1923 | Case et al. . |
| 2,530,819 | 11/1950 | Hamlin . |
| 3,021,855 | 2/1962 | Cartwright et al. . |
| 3,834,132 | 5/1989 | Sasaki et al. ................... 137/147 X |
| 4,579,139 | 4/1986 | Stouffer ............................... 137/142 |
| 4,838,307 | 6/1989 | Sasaki et al. ................... 137/571 X |

Primary Examiner—Gerald A. Michalsky
Attorney, Agent, or Firm—Kenneth H. MacLean

[57] ABSTRACT

A device and system to transport fuel from one interior portion of a fuel tank to another by automatic siphon action, the siphon being initiated by an aspirator which evacuates air and fuel vapor from the siphon by the flow effect of the return fuel through a venturi or reduced diameter portion of the return fuel line.

2 Claims, 2 Drawing Sheets

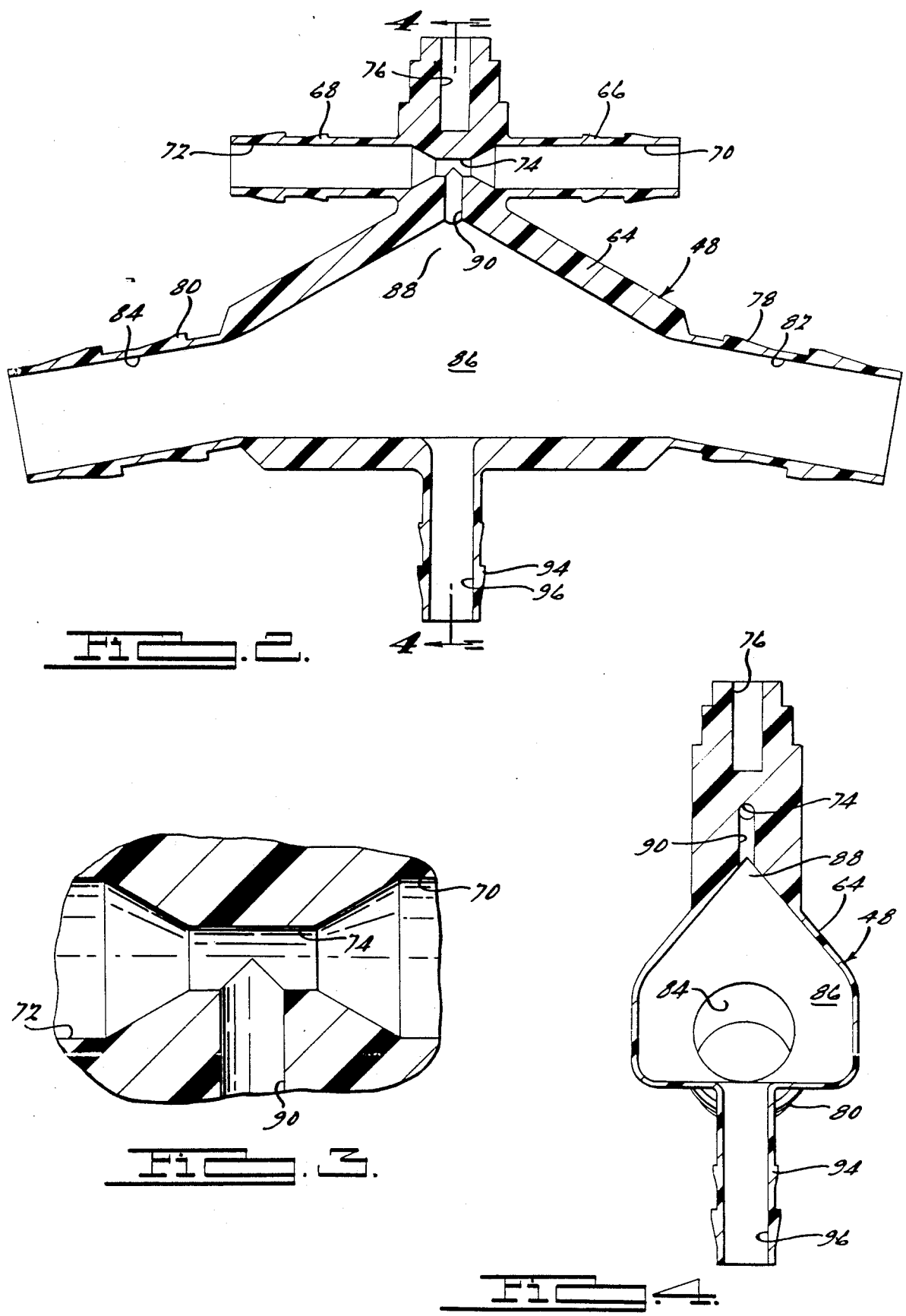

FUEL TRANSFER SYSTEM WITH ASPIRATOR

BACKGROUND OF THE INVENTION

1. Field of the Invention

The present invention relates to an apparatus and system to automatically transfer fuel between separated portions of a fuel tank through a siphon action device which is primed by the evacuation of air and vapor by means of fuel flowing through an aspirator.

2. Description of the Relevant Art

In vehicles, a fuel tank configuration of two separated interior portions is often desirable. For example, a dual tank with a general saddle like configuration is often used on truck type vehicles. The tank has two separate and relatively deep side portions which can be connected by a shallower mid portion. This configuration is also desirable for sports type vehicles in which the vertical dimension is very limited. This tank configuration provides a space or channel between the two tank portions for a drive shaft or exhaust tubes, for example. In this configuration, fuel cannot flow by means of gravity between the two deep portions of the fuel tank. When fuel is extracted from only one tank portion, the fuel level in the other portion does not decrease. Resultantly, the weight of the two tanks is unequal. A solution is to provide a fuel intake and perhaps separate pumps in both portions of the fuel tank. But, this is a costly and complex solution.

Another solution to the aforedescribed problem is to provide a cross-over passage located near the bottom of the two tank portions. However, this practically defeats the advantage of providing the channel between the tank portions. It also increases the possibility of leaks.

Another solution is to provide a special fuel pump in the tank which operates when needed to transfer fuel from one side of the tank to the other thus maintaining the level in the two tanks. This is a complex and costly solution.

The subject invention provides apparatus to siphon fuel automatically from one side of the tank to the other. When the engine is operating, siphon action is initiated by purging the siphon of air and/or fuel vapors by the flow of fuel through the engine fuel system. Specifically, an aspirator evacuates air and fuel vapor as fuel passes through a venturi passage.

The use of a siphon initiated by a pump is old. An example is found in U.S. Pat. No. 431,542 in which a siphon is utilized to transfer liquid from one body of water to another. The pump is utilized to initiate siphon action by withdrawal of air from the upper portion of the siphon.

U.S. Pat. No. 1,472,428 discloses another siphon used to transfer liquid from one body to another and utilizes a pump to withdraw air from the high point in the siphon.

U.S. Pat. No. 3,021,855 discloses a saddle shaped fuel tank with separate right and left-hand tank portions. The left and right-hand tank portions are connected by a siphon apparatus. The siphon's inlet end in one tank has a one-way check valve to allow fuel flow into the siphon but not out. During operation of the associated vehicle, surges in liquid fuel in the one tank forces liquid into the siphon and the check valve prevents reverse flow out of the siphon. Successive fuel surges fills the siphon which may then begin to transfer liquid for the purpose of equalizing fuel levels.

U.S. Pat. No. 2,530,817 discloses another saddle shaped fuel tank with right and left-hand portions. Fuel is withdrawn from both the right and left-hand tanks through dual inlets which are commonly connected to a main fuel line leading to the engine.

SUMMARY OF THE INVENTION

In this application, an automatic fuel transfer system for a saddle shaped fuel tank is provided. In accord with a typical fuel delivery system, an in-tank fuel pump is used to pump fuel from one portion of the fuel tank to the engine. Excess fuel which is not used by the engine flows from the engine back to the tank through a return line. The subject transfer device utilizes this return flow to prime the siphon by evacuating air and vapor from the siphon which extends between the two tank portions.

The fuel transfer apparatus includes a housing with a passage connected to the siphon line. Fuel returning from the engine flows through another passage with a reduced diameter or venturi portion. A cross passage in the housing connects the siphon passage and the venturi. As fuel flows through the venturi, air and fuel vapors are evacuated from the siphon passage thus filling the siphon with liquid and initiating automatic siphoning action between the two portions of the fuel tank.

The accompanying drawings which are incorporated in this specification, illustrate an embodiment of the invention and together with the following description serve to explain the principles of the invention.

BRIEF DESCRIPTION OF THE DRAWINGS

FIG. 2 is an enlarged sectioned elevational view of the fuel transferring siphon device shown in FIG. 1; and FIG. 3 is a much enlarged fragmentary view of a portion of the device shown in FIG. 2; and FIG. 4 is a sectioned end view of the device taken along section line 4—4 in FIG. 2 and looking in the direction of the arrows.

DESCRIPTION OF A PREFERRED EMBODIMENT

Figure 1:
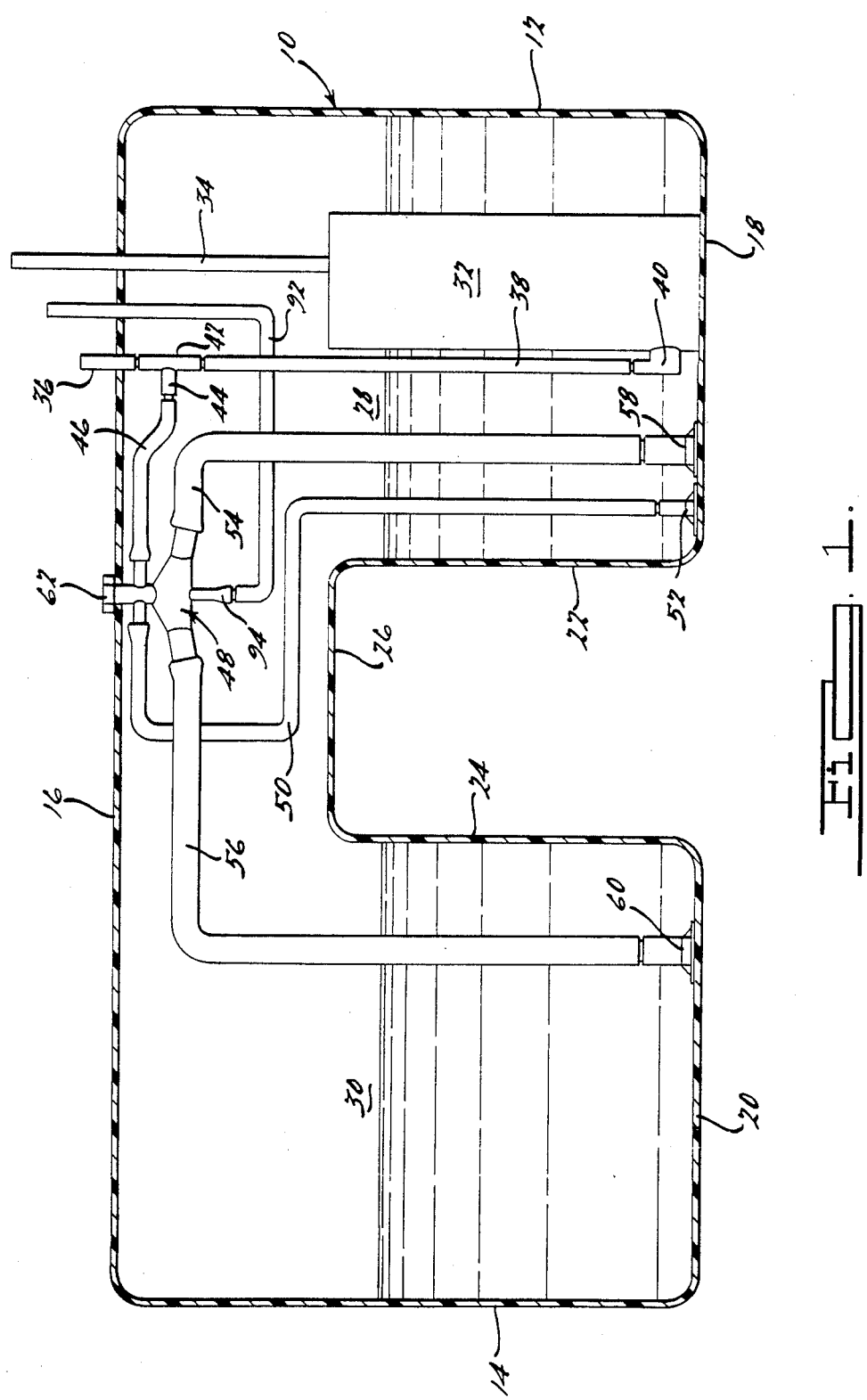
FIG. 1 is a sectioned elevational view of a saddle shaped fuel tank having an in-tank fuel pump and the subject fuel transferring siphon device with an aspirator.

An embodiment of the present invention will be explained with reference to the two sheets of drawings.

In FIG. 1, a saddle shaped fuel tank 10 is illustrated which includes separated portions 12 and 14. Portions 12 and 14 have a significant depth relative to the mid portion of the tank. Specifically, the top wall 16 of the tank is common to the two separated portions 12 and 14. The bottom wall 18 of portion 12 and bottom wall 20 of portion 14 are spaced from one another by a channel formation (labeled A) which is formed by interior side walls 22 and 24 and an upwardly spaced wall 26. Thus, the channel A can be used to extend a drive shaft and-/or exhaust tubes (not shown) through the separated portions of the fuel tank 10..

Accordingly, the fuel tank 10 is effectively divided into two interior portions 28 and 30. As far as liquid is concerned, these interiors portions are separate and distinct from one another anytime the liquid level falls below wall 26 as shown in FIG. 1. The associated engine is provided with fuel by a reservoir and fuel pump assembly 32 which is shown in the interior of the rightward tank 28. Fuel is pumped from the interior 28 by the fuel pump 32 and is then passed through a conduit 34 to the associated engine (not shown). Under almost all operating conditions, the capacity of the fuel pump 32 is greater than the fuel needs of the engine. Thus, a substantial quantity of the fuel must be returned to the fuel tank. A return line or conduit 36 returns the fuel and extends from the engine back to the fuel tank. In the tank, a lower portion 38 of conduit 36 extends upward from an outlet fitting 40. The outlet 40 is associated with the reservoir portion of the assembly 32 and basically consists of a hollow housing surrounding the fuel pump. The outlet filling 40 is configured to direct a stream of fuel through an enlarged opening in the lower portion of the reservoir. When the liquid level in the tank is very low, this flow tends to draw additional fuel into the reservoir from the bottom portion of the tank 10. By this means, a high level of liquid can be maintained in the reservoir so that the fuel pump has enough liquid to pump.

Located upwardly from the outlet 40 in the upper portion of the tank, a T-type fitting 42 is provided between return positions 36 and 38. An outlet 44 receives some of the flow of return fuel from the engine. This fuel then passes through a conduit 46 into a housing 48 of the subject fuel transfer apparatus. From housing 48 the fuel passes through a conduit 50 to an outlet fitting 52 which is positioned above the bottom wall 18. The structure and function of the fuel transfer apparatus will be explained more specifically hereinafter.

As previously indicated, it is desirable to equalize the fuel levels within tank interiors 28 and 30. For this purpose, two tubes or conduits 54 and 56 are attached to the housing 48 and connected internally therein. Conduit 54 extends through the tank interior 28 and is attached to an inlet/outlet fitting 58 just above the tank wall 18. Likewise, conduit 56 extends through the interior 30 and is attached to an inlet/outlet fitting 60 just above the tank wall 20. It should be noted that the housing 48 is supported by the upper wall 16 of the fuel tank and fastened thereto by a fastener 62 in the preferred embodiment. Other means could serve the same function.

For an understanding of the details of the fuel transfer apparatus, reference is made to FIGS. 2-4. The housing 48 has thin walls 64 to define a generally hollow interior. The upper portion of housing 48 has an inlet fitting 66 and an outlet fitting 68 extending therefrom. The fittings 66 and 68 define inlet and outlet passages 70 and 72 respectively. Fittings 66 and 68 are adapted to be attached to conduits or tubes 46 and 50 as is illustrated in FIG. 1. Located between the inlet and outlet passages 70 and 72, is a reduced diameter or venturi section 74. The venturi causes the fuel flowing therethrough to increase in velocity and thus decrease in pressure.

A threaded bore 76 is shown in FIG. 2. It is provided to receive the lower threaded portion of fastener 62 for supporting the housing in the tank.

A pair of hose or conduit fitting 78 and 80 are formed by the lower portion of the housing 48 and ar adapted to be attached to the conduits 54 and 56 a is illustrated in FIG. 1. The fittings 78 and 80 define passages 82 and 84 which are connected in the housing 48 by an interior passage 86. The configuration of the interior passage 86 is formed with an upwardly projecting dome or space 88. It is easy to understand that air and fuel vapors will tend to collect in the dome 88, it being the uppermost portion of passage 86.

To initiate siphoning between passageways 82 and 84, the air and fuel vapor must be evacuated from dome 88 and replaced with liquid. To evacuate air and vapor, a cross-passage 90 is provided, reference being made to FIG. 3 for an enlarged view of the cross-passage and the venturi 74. Cross-passage 90 extends between the venturi 74 and the dome 88. When the fuel velocity increases in venturi 74, the fuel pressure is depressed. This produces a suction action and this draws air and fuel vapor upward from dome 88 through the cross-passage 90 and into the flow of fuel. As air and vapor are evacuated, liquid fuel is drawn into the interior of the housing and siphon action commences.

One further feature of the subject aspirated fuel transfer apparatus is worth mentioning. Referring again to FIG. 1, a drain tube or conduit 92 is provided for the purpose of selectively draining the fuel tank 10. The conduit 92 is attached to a fitting 94 formed at the bottom portion of the housing 48. Referring back to FIGS. 2-4, fitting 94 defines a passage 96 which is connected to passage 86. By attaching a pump to the exterior end of conduit 92, fuel can be drawn from the interior portions 28 and 30 of fuel tank 10 through the housing 48.

Although only a single embodiment of the subject device has been illustrated and described in detail, it is easy to understand that modifications may be made in the configuration and arrangement of the invention which still would fall within the scope of the following claims which define the invention.

I claim:

1. In combination with a vehicle fuel tank having a multiple interior compartments separated one from another by an upwardly directed channel forming means int eh bottom wall of the tank so that liquid fuel is prohibited from flowing back and forth between the interior compartments when the liquid level of the fuel is below the uppermost portion of the channel forming means and with a fuel supply apparatus for an engine including a fuel pump to transfer fuel from the fuel tank to an engine and to return a portion of the fuel back to the fuel tank through a return line, a siphon action type liquid fuel leveling system to equalize liquid fuel levels in the interior compartments of the fuel tank; the leveling system including a housing supported within the fuel tank above the uppermost portion of the channel, the housing defining a siphon flow passage therethrough with openings to the interior of the fuel tank; a first conduit means fluidly connecting one of the openings to a lower portion of one of the fuel tank's interior compartments; a second conduit means fluidly connecting the other of the openings to a lower portion of another of the fuel tank's interior compartments; the siphon flow passage in the housing having a configuration between the openings including an upwardly directed domed space, wherein air and fuel vapors tend to rise and collect; aspirator type means formed in the housing to withdraw air and fuel vapor from the domed space thereby initiating siphon action through the housing, the aspirator means including a venturi passage extending through the housing in a position above the siphon flow passage, the venturi passage having an inlet and an outlet thereto; third conduit means between the venturi inlet and the return line for receiving liquid fuel and delivering it to the venturi passage; fourth conduit means between the venturi outlet and the interior of the fuel tank so that liquid fuel flows through the venturi passage; the venturi passage having a reduced dimension portion between the inlet and outlet which creates a restriction which increases fuel velocity and decreases fuel pressure; a small cross-passage formed in the housing connecting the upper portion of the domed space and the reduced dimension portion of the venturi passage, whereby air and fuel vapors are withdrawn from the siphon flow passage causing it to fill with liquid fuel from the interior compartments and thereafter facilitating two-way siphon flow of liquid fuel between the interior compartments so that the liquid level in each is maintained the same.

2. The siphon type fuel leveling system set forth in claim 1 in which the housing has a drain passage therein extending from the siphon flow passage to an outlet passage in the housing; means from the outlet passage to the exterior of the fuel tank for withdrawing air and fuel from the siphon flow passage and the tank interior when evacuation of the tank is desired.

* * * * *